United States Patent [19]

Lewis

[11] Patent Number: 4,578,677

[45] Date of Patent: Mar. 25, 1986

[54] RANGE DOPPLER COUPLING MAGNIFIER

[75] Inventor: Bernard L. Lewis, Ft. Washington, Md.

[73] Assignee: The United States of America as represented by the Secretary of the Navy, Washington, D.C.

[21] Appl. No.: 535,085

[22] Filed: Sep. 23, 1983

[51] Int. Cl.$^4$ ............................................. G01S 13/28
[52] U.S. Cl. ............................................. 343/17.2 PC
[58] Field of Search ................... 343/17.2 PC, 5 FT; 364/726

[56] References Cited

U.S. PATENT DOCUMENTS

| | | | |
|---|---|---|---|
| 3,852,746 | 12/1974 | Lowenschuss et al. | 343/17.2 PC |
| 4,005,417 | 1/1977 | Collins | 343/55 A |
| 4,047,173 | 9/1977 | Miller | 343/17.2 PC |
| 4,132,991 | 1/1979 | Wocher et al. | 343/13 R |
| 4,156,876 | 5/1979 | Debuisser | 343/17.2 PC |
| 4,203,112 | 5/1980 | Wocher et al. | 343/13 R |
| 4,237,461 | 12/1980 | Cantrell et al. | 343/5 FT |
| 4,328,495 | 5/1982 | Thue | 343/17.2 PC |
| 4,373,190 | 2/1983 | Lewis et al. | 364/715 |
| 4,524,362 | 6/1985 | Lewis | 343/17.2 PC |

Primary Examiner—Thomas H. Tarcza
Assistant Examiner—Mark Hellner
Attorney, Agent, or Firm—Robert F. Beers; Sol Sheinbein; William T. Ellis

[57] ABSTRACT

A pulse expander-compressor for magnifying the range-doppler-coupling effects that accompany the use of frequency-modulation derived phase coded pulse compressors in order to accentuate the doppler-coupling velocity effects on target echoes. The foregoing magnification is accomplished by generating a doppler tolerant polyphase coded waveform with equal time spaces inserted between successive code elements in order to make the time difference between the first and last code elements independent of the number of code elements involved. These equal spaces may be variable in order to allow any desired target radial velocity to produce a phase difference between the first and last code elements of $2\pi$.

The foregoing may be implemented in a pulse expander-compressor by replacing each delay $t_c$ in the compressor input-signal expansion circuit by a set of N delay elements $t_c$, and a set of N associated switches, the switches permitting each element in the set to be connected or bypassed, as desired. The time-dispersion circuit for the compressor is likewise modified by replacing each of its $Mt_c$ delays by a set of N delay elements $Mt_c$, each of which is independently connectable or bypassable.

11 Claims, 2 Drawing Figures $P_3$ EXPANDER-COMPRESSOR, $p=T/t_c=16$

P$_3$ EXPANDER-COMPRESSOR, p=T/t$_c$=16

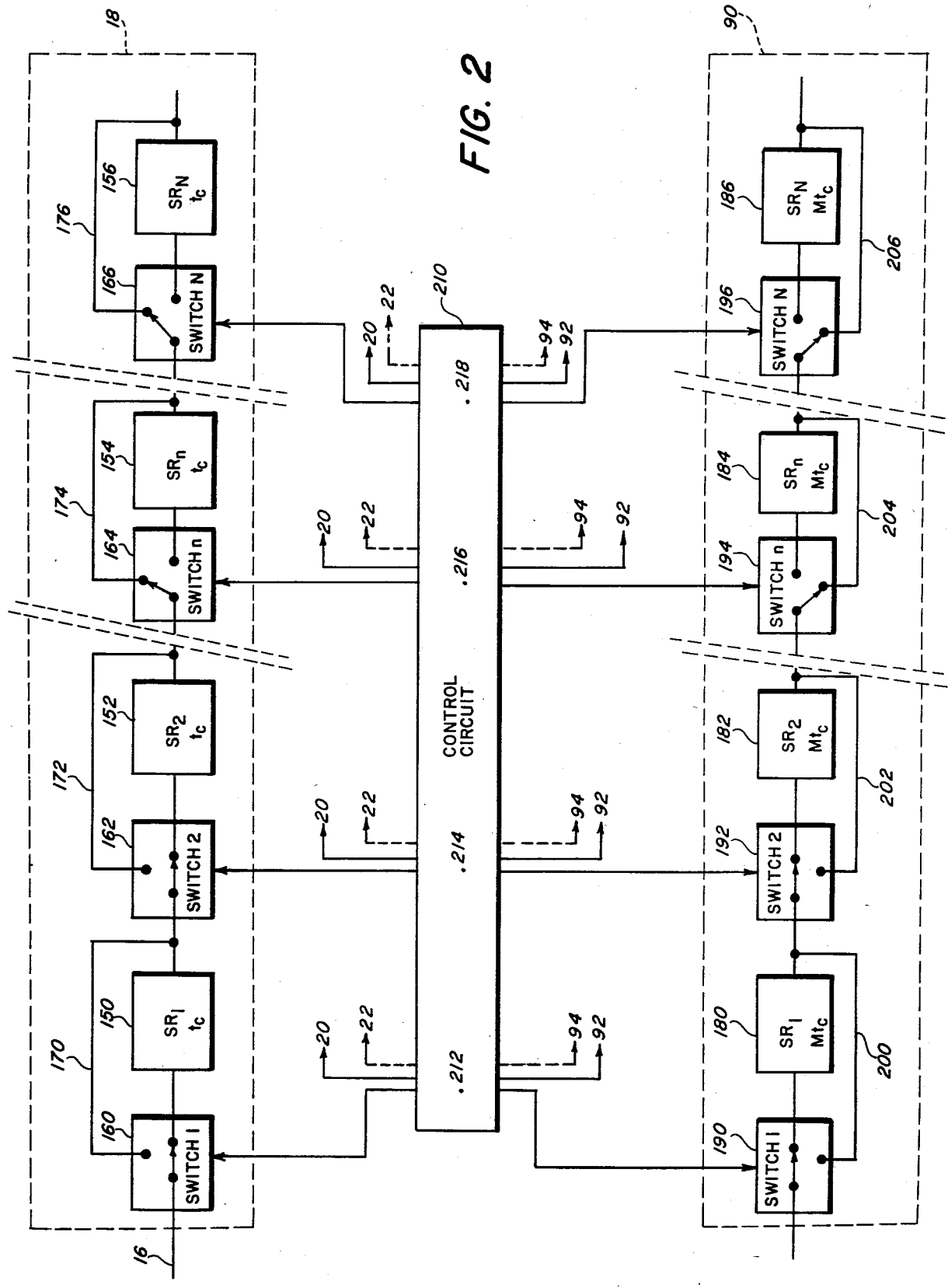

RANGE DOPPLER COUPLING MAGNIFIER

BACKGROUND OF THE INVENTION

The present invention relates generally to the field of radar, and more particularly, to radar pulse expander-compressors utilizing frequency-modulation derived phase coded pulses.

Accurate parameter estimation in radar systems involves the precise determination of a targets' true range R and velocity V with respect to the radar. Accurate range determination requires small range-time resolution cells $\Delta t$. Since the size $\Delta t$ of the time resolution cells is determined by the equation $\Delta t = 1/B$, where B is the radar pulse bandwidth, an accurate range determination requires a wide bandwidth B. Accurate velocity estimation, in turn, requires two or more samples of target range at different times with the time differences between samples great enough to permit meaningful values of $(R_1-R_2)/(t_1-t_2)$.

Range-doppler-coupling waveforms and matched filters (pulse compressors) can be employed to provide radar displays from which accurate target range and velocity can be estimated. A radar can transmit an up chirp on one pulse and a down chirp on the next pulse and compress echoes from each transmission with an appropriate matched filter. Echoes from non-moving targets will compress at the same time after transmission on the two matched filter outputs. However, echoes from targets moving radially toward or away from the radar will compress at different times after transmission in the two compressors due to range-doppler coupling. Range-doppler coupling comprises the addition of a doppler frequency to the echos of moving targets equal to $f_D = 2V/\lambda$, where V is the radial velocity of the target with respect to the radar, and $\lambda$ is the radar's carrier wavelength. The time difference between the up and down chirp compressions is directly proportional to the target velocity magnitude and the time duration of the transmitted coded pulse. The midpoint between the two compressed pulses indicates the true target range. The direction of the target velocity can be determined by determining which matched filter produced the shortest time delay between transmission and compression.

As is well known, the product of the transmitted uncompressed waveform T and the bandwidth of the waveform B, determines the pulse compression ratio p. In order to achieve good velocity sensitivity, large pulse compression ratios are required. However, the bandwidth B, which is related to the size of the desired range-time cells $\Delta t_c$, is generally fixed by system parameters. Thus, in order to increase a system's velocity sensitivity, the length of the uncompressed pulse must be increased. Since the time width of the individual code elements (or time cells) in the uncompressed pulse is generally fixed by the bandwidth, an increased uncompressed pulse length must be obtained by increasing the number of code elements in the pulse. However, although a code element increase increases the pulse compression ratio, the Fast Fourier Transform (FFT) hardware required to implement this code element increase is significant. For example, assuming a standard 1 microsecond compressed pulse length (i.e. a 1 microsecond code element size), to obtain a 1 millisecond uncompressed pulse length 1000 code elements are required. In order to implement 1000 code elements, the square root of 1000 FFT points are required. The hardware cost and complexity required to realize such an increase in velocity sensitivity is thus a significant drawback.

OBJECTS OF THE INVENTION

It is an object of the present invention to accentuate velocity effects on target echos in order to permit target range and velocity to be estimated accurately using relatively few coded transmissions.

It is a further object of the present invention to magnify range-doppler-coupling effects that accompany the use of frequency modulation or frequency-modulation-derived phase coded pulses in radars or sonars.

It is yet a further object of the present invention to achieve good velocity sensitivity in a radar system with a relatively low pulse compression ratio.

It is a further object of the present invention to control the minimum resolvable velocity in a radar system.

It is a further object of the present invention to obtain good velocity sensitivity in a radar system with low hardware cost and complexity.

It is a still further object of the present invention to make the uncompressed transmit waveform duration independent of the pulse compression ratio and the bandwidth of the radar system.

Other objects, advantages, and novel features of the present invention will become apparent from the detailed description of the invention, which follows the summary.

SUMMARY OF THE INVENTION

Briefly, the above and other objects are achieved in a pulse expander-compressor system including an input signal expansion circuit responsive to an applied pulse for successively generating M replicas y(m) of the pulse with the time-spacing between adjacent pulse replicas equal to a constant $(n-1) t_c$, where n is an integer $n=1, 2, 3, 4, \ldots N$, and $t_c$ is the Nyquist sampling period for the bandwidth of the applied pulse; a matched filter weighting circuit for receiving the M pulse replicas from the input-signal expansion circuit and weighting the pulse replicas y(m) with predetermined weights to effect the phase weights for a doppler tolerant polyphase code and, providing M weighted output pulses; and a time dispersion circuit including a plurality of adder circuits and first delay stages connected in series, with the adder circuits alternating with the first delay stages, and with each of the adder circuits being connected to receive a different one of the M weighted output pulses from the weighting circuit. Each of these first delay stages provides a delay which is equal to $nMt_c$. This expander-compressor is clocked at the Nyquist rate for the bandwidth of the applied pulse.

In one embodiment of the present invention, the input signal expansion circuit comprises M-1 expansion stages for generating the M replicas, with each expansion stage comprising a set of N expansion delay elements individually connectable within the expansion stage to delay the applied pulse; and a first switching circuit for controlling which of the N expansion delay elements are connectable within the expansion stage to yield a delay of $nt_c$ for each expansion stage. The first delay stages of the time dispersion circuit in this embodiment may each comprise a set of N first delay elements individually connectable within the first delay stage to delay a selected one of the M weighted output pulses; and a second switching circuit for controlling which of the N first delay elements are connectable within the first delay stage to yield a delay of $nMt_c$.

In one implementation of this embodiment, the first and second switching circuits may comprise an individual switch for each of the N expansion delay elements and the N first delay elements; and a control circuit for simultaneously operating the same chosen switches in the set of N switches in each of the M expansion stages and in each of the M first delay stages.

BRIEF DESCRIPTION OF THE DRAWINGS

FIG. 2 is a schematic block diagram of one expansion delay element in the input signal expansion circuit and one first delay stage in the time dispersion circuit.

DETAILED DESCRIPTION OF THE PREFERRED EMBODIMENT

Figure 1:
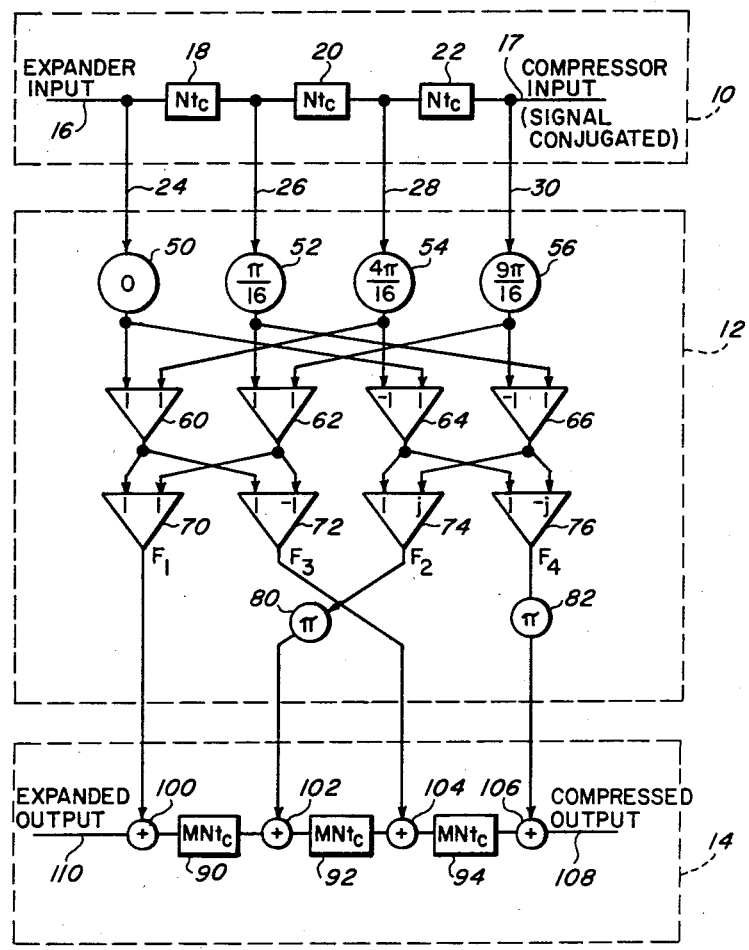
FIG. 1 is a schematic block diagram of one type of polyphase pulse expander-compressor which may be utilized to implement the present invention.

The present invention is based on the use of a noncontinuous uncompressed pulse. In essence, this invention divorces the transmit uncompressed pulse length from the pulse compression ratio and bandwidth (standard equations $p=TB$ and $kB=T$ are no longer true) in order to obtain good velocity sensitivity with any desired pulse compression ratio and/or bandwidth. The invention utilizes frequency-modulation-derived polyphase-coded waveforms, as do certain other prior art systems. However, it transmits the successive code elements in the uncompressed pulse with equal time spaces inserted between successive elements to make the time difference between first and last code elements (uncompressed pulse length) independent of the number of code elements involved.

The significance of this innovation in terms of velocity sensitivity can be understood as follows.

The velocity sensitivity equations will be derived, for convenience, using an analog continuous chirp waveform. Thus, assume a two-pulse noncoherent range-doppler-coupled radar MTI system. Further assume that the radar transmits a pulse of length T with a frequency linearly swept over a bandwidth B on each transmission. In addition, assume that the radar has a constant interpulse period and that the radar's frequency sweep is reversed on alternate transmissions.

The radar pulse compressor employs a well known frequency dispersive delay line whose time delay is $$D = D_o + kf \quad (1)$$

where $D_o$ is a constant, f is the frequency of the signal traveling through the delay line, and k is a constant relating frequency to delay.

This delay line is driven at the radar intermediate frequency (IF) which, on a downsweep transmission, is obtained by beating echo signals with a local oscillator below the received signal frequency, and on an upsweep transmission, the echo signals are beat with a local oscillator frequency above the echo signal freqency to reverse the IF frequency sweep. Thus, the IF echo signal from any target starts with a high-frequency $f_2$ and ends with a low-frequency $f_1 = f_2 - B$. k In Eq. (1) is chosen so that all frequencies in the echo exit from the dispersive delay line at the same time. This requires that $$k(f_2 - f_1) = kB = T \quad (2)$$

(True for continuous analog waveforms) or $$k = T/B. \quad (3)$$

With this value of k, the output of the dispersive delay line is a pulse of length $$t_c = 1/B \quad (4)$$

and the radar pulse compression ratio is $$p = T/t_c = TB \quad (5)$$

(True for continuous analog waveforms)

This value of $t_c$ provides the radar with a range resolution of $$\delta R = t_c c/2 = c/2B \quad (6)$$

where c is the velocity of light.

The range-doppler coupling in this type of radar system can be understood as follows. Due to the frequency dispersion characteristic of the dispersive delay line (increasing delays for higher frequencies), a transmitted frequency that on its return would have exited from the delay line at a time $t_o$ for a nonmoving target, will exit at a time $$t_e = t_o + kf_d \quad (7)$$

if the target is moving and thus has a doppler frequency $f_d = 2V/\lambda$ added thereto, where V is the target velocity and $\lambda$ is the wavelength of the radar's carrier transmission. However, since $k = T/B$, then equation (7) can be written:

$$t_e = t_o + (T/B)(2V/\lambda) \quad (8)$$

For this equation, it is assumed that an incoming target has a positive V and an outgoing target a negative V, in order to yield the proper sign for $f_d$. The time shift of the echo signal $(T/B)(2V/\lambda)$ caused by the addition of the doppler frequency $f_d = 2V/\lambda$ produces a velocity-dependent range shift $$2\Delta R = \text{(signal velocity)(doppler time shift)} \quad (9)$$

$$2\Delta R = (c)(T/B)(2V/\lambda)) \quad (10)$$

Note that $\Delta R$ must be multiplied by a factor of 2 because the doppler time shift includes the time-required for the pulse to propagate toward the target and to return.

It is known that the response of an oppositely swept two pulse radar to a moving target maximizes when the opposite range-doppler coupling on the successive oppositely-chirped pulses allows the radar's range resolution to separate the two echos from the moving target, i.e., when the two echos are in adjacent range cells. The requirement for the two echos to be in adjacent range cells is that the range shift $\Delta R$ caused by the doppler frequency time shift given in equation (10) is equal to one half $\delta R$ given in equation (6), or $$\Delta R(V_m Tc)/(\lambda B) = (\tfrac{1}{2})(c/2B) \quad (11)$$

where $V_m$ is the velocity for a maximum response. By various algebraic manipulations, equation (11) can be transformed to $$V_m T = \lambda/4 \qquad (12)$$

$$V_m = \lambda/4T = c/4Tf_o \qquad (13)$$

where $f_o$ is the radar's carrier frequency. Equation (13) must be satisfied in order to make the two doppler echos contiguous and thus obtain a maximum target response with no overlap between the oppositely-chirped echos. Note that the maximum response does not decrease significantly for velocities greater than $V_m$. Thus, $V_m$ represents a low frequency limit for obtaining a maximum response.

It can be seen that the velocity $V_m$ at which a maximum response is obtained depends on the value of T, the uncompressed pulse length. The greater the value of T, the lower the velocity, $V_m$, for maximum sensitivity.

Note also that the phase difference $\phi$ between echos from the first and the last code elements in the transmitted uncompressed pulse is equal to the uncompressed pulse length T times the doppler frequency in radians $\omega_d$, or $$\phi = 2\pi f_d T = (2\pi)(2V_m)T/\lambda. \qquad (14)$$

By algebraically manipulating equation (12), one side can be made equal to the phase difference $\phi$, or $$\phi = 4\pi V_m T/\lambda = 4\pi\lambda/4\lambda = \pi \qquad (15)$$

It has been discovered that this relationship of T and $V_m$ holds even when the transmit pulse length T is divorced from the pulse compression ratio, i.e., $\rho \neq TB$, and divorced from the bandwidth, i.e., $kB \neq T$. It has been discovered that the digital FFT polyphase pulse compressor used to simulate the analog chirp waveform maintains the T to $V_m$ relations, even while allowing spaces to be placed between the code elements of the uncompressed pulse. These spaces increase T without a concommittant change in the bandwidth B and the pulse compression ratio. Thus, $V_m T$ in equation (12) can be arbitrarily set to a desired value. If $V_m T = \lambda/4$ (equation (12)), i.e. $\phi = \pi$, an up chirp compressor will compress an echo from a target of velocity $V_m$ in a range cell adjacent to the compressed echo from the same target from the down chirp compressor. Higher velocity targets produce larger range-doppler-coupling shifts in the compressed output times.

Note that if $V_m T$ is made equal to $\lambda/2$, i.e., $\phi = 2\pi$, then a full range cell will separate the oppositely chirped compressed pulses. An additional range cell can be added between the two compressed pulses for every quarter wavelength $\lambda/4$ added to equation (12).

The present expander-compressor invention will be described in terms of a sixteen element polyphase code by way of example. It should be noted however, that the present invention is in no way limited to a 16 element code.

Additionally, the present invention is implemented in the accompanying drawings utilizing a fast Fourier transform circuit in the weighting circuit. It should again be understood that the weighting circuit for the 16 element code may be implemented in other configurations.

Referring now to the drawings, wherein like reference characters designate like or corresponding parts throughout the views, FIG. 1 is a schematic diagram of one embodiment of the present invention. The expander-compressor of FIG. 1 comprises an input expansion circuit 10, a weighting circuit 12, and a time dispersion circuit 14. The input-signal expansion circuit 10 is designed in order to provide M replicas of an input pulse to be expanded, where $M^2 = \rho$, where $\rho$ equals the pulse compression ratio, or the number of code elements, in the present example 16. In order to obtain the M replicas of the input pulse applied on line 16, $M-1$ expansion delay elements are required. In this example for 16 code elements, $M-1$ is equal to three expansion delay stages 18, 20, and 22. These expansion delay stages 18–22 set the time spacing between individual samples of the applied pulse $t_c$. The spacing, $t_c$, may be arbitrary. However, the delay parameter $t_c$ is preferably made equal to the sampling period of the IQ sampler for the system. In a preferred embodiment, the sampling period is made equal to the reciprocal of the transmitted pulse bandwidth (reciprocal of the Nyquist rate). All of the elements in the expander-compressor circuit of FIG. 1 should then be shifted at this same rate, the Nyquist rate.

From the above, it can be seen that for a 16 element code, M replicas (in this case 4) of the applied pulse are provided on lines 24, 26, 28, and 30 to the weighting circuit 12. The weighting circuit 12 acts to add the appropriate phase weights to these replicas in order to generate a polyphase pulse compression code. In FIG. 1, the weighting circuit 12 is realized by a fast Fourier transform circuit in combination with a series of phase shifters in order to implement the standard discrete Fourier transform equation.

$$s(k) = \sum_{m=0}^{k-1} X(m) e^{-j2\pi mK/M}.$$

Such fast Fourier transform circuits are well known in the art and are typically implemented by steering filter matrices. An example of one such steering filter matrix is shown in block 12. For purposes of illustration, a fast Fourier transform for generating a $P_3$ code is shown. It is understood, of course, that any frequency-modulation-derived code, i.e., a doppler tolerant code, may be utilized in the present design.

Referring now to block 12, the actual steering matrix comprises a set of multiplier-adder circuits 60, 62, 64, 66, 70, 72, 74, and 76. These elements 60–76 each have two inputs applied thereto. These individual elements multiply each input thereto by the complex number immediately adjacent to the input line in the diagram. Then, the two multiplied inputs in the block are added together and applied on the output line thereof for each element. This type of fast Fourier transform steering filter matrix is well known in the art.

In essence, fast Fourier transform circuits can be viewed as acting as comb frequency filters. Thus, such Fourier transform and fast transform circuits are especially suited for generating and compressing polyphase codes which are derived from step approximation to linear frequency modulation waveforms. The most notable of these doppler tolerant stepped chirp derived codes are the Frank code and the P-1 and the P-2 codes. The Frank code and the P-1 and P-2 codes are disclosed in IEEE Transactions on Aerospace and Electronics Systems, Vol. AES 17, No. 3, May 1981. The P-3 code which is being generated in block 12 is disclosed in NRL Report 8541 entitled "Linear Frequency Modulation Derived Polyphase Pulse-Compression Codes and An Efficient Digital Implementation", by B. L. Lewis and F. F. Kretschmer, Jr., dated 2 Nov. 1981. This report is hereby incorporated by reference. The P-3 expander-compressor is also set forth in application Ser. No. 377,107 by B. L. Lewis. The P-3 code is derived from a linear frequency modulation waveform. There is a continuous frequency change in the P-3 code during the time when the equivalent Frank code frequency is a constant. Accordingly, small phase increments must be added from code element to code element that repeat every $\rho^{\frac{1}{2}}$ samples in order to account for the phase change caused as a result of the continuous frequency change. These phase shifts are accomplished by inserting in the time sample output lines 24–30 the phase shift boxes 50, 52, 54, and 56 respectively. The P-3 code also differs from the aforementioned P-1 and P-2 codes by the requirement to add $\pi$ phase shifts every $\rho^{\frac{1}{2}}$ elements. A set of inverters 80 and 82 are disposed in every other output line in FFT 12, i.e., the $F_2$ and $F_4$ frequency ports, in order to implement the $\pi$ phase shifts every $\rho^{\frac{1}{2}}$ as required to obtain the linear chirp derived code.

There are a variety of other doppler tolerant frequency-modulation derived codes which may be utilized with the present invention. By way of example, a code very similar to the P-3 code is the P-4 code, which is also derived from a linear frequency modulation waveform. The P-4 code is described in aforementioned NRL Report 8541 and in patent application Ser. No. 420,209 filed 20 Sept. 1982. The PP-3 and PP-4 codes are similar to the P-3 and P-4 codes. These codes are set forth in application Ser. No. 512,045, filed 8 July 1983, entitled "Polyphase Coded Pulse Compressors with Real Autocorrelation Functions" by Lewis & Kretschmer, Jr.

In the circuit of FIG. 1, there are four output lines $F_1$, $F_2$, $F_3$ and $F_4$ from the weighting circuit 12. These output lines are applied to the signal time dispersion circuit 14. This time dispersion circuit 14 comprises a delay line having a series of $M-1$ first delay stages 90, 92, and 94, where M is equal to the number of samples or points in the FFT. Each of these first delay stages is provided with a delay of $nMt_c$. In this case, $n=1, 2, 3, 4 \ldots N$, and $t_c$ is the Nyquist sampling period for the bandwidth of the applied pulse. In the present example with $M=4$, each first delay stage has a delay equal to $4nt_c$. A set of adder elements 100, 102, 104, and 106 are disposed in series before each of the first delay stages and after the last delay stage 94. These adder elements 100–106 constitute the taps into the delay line forming the time dispersion circuit 14. The four output lines from the weighting circuit 12 are connected each to a different one of the adder elements 100–106, as shown in FIG. 1.

In the expansion mode, the present circuit operates as follows. An input pulse on line 16 is clocked into the input signal expansion circuit 10. This short pulse propagates through the M expansion stages 18, 20, and 22 providing four separate replicas of the input pulse on the lines 24, 26, 28, and 30. It can be seen that after four clock pulses, the input to the FFT 12 is as follows, 1000, 0100, 0010, and 0001. Since each of the input lines to the FFT 12 contains it own specially set phase weight 50, 52, 54, and 56, each of the input lines is appropriately phase weighted prior to its application to the steering matrix in the FFT circuit.

The FFT circuit 12 then operates to steer these input signals within the FFT filter matrix such that the four samples of the frequency $F_1$ are obtained at the $F_1$ output port, four samples of the frequency $F_2$ are obtained at the $F_2$ output port, etc. Accordingly, four replica inputs to the FFT circuit are sufficient to generate sixteen code elements. These sixteen code elements on the delay line of the time dispersion circuit 14 are then clocked out on the line 110.

In the receive or compression mode the echos of the polyphase coded signal are conjugated and then fed back through the input-signal expansion circuit 10 on line 17 in inverted order relative to the manner in which the original input pulse passed through the input-signal expansion circuit. The outputs 24–30 from the input signal expansion circuit 10 are again phase weighted by the specially chosen phase weights 50-56 and applied as inputs to the FFT circuit 12. The FFT circuit 12 appropriately steers these samples by means of its filter matrix and provides inputs to the four adder taps 100, 102, 104, and 106 of the signal time dispersion circuit 14. The signals on the taps for the delay line of the time dispersion circuit are then clocked out of the delay line on the line 108 at the Nyquist rate, i.e., in the opposite direction than for the expansion operation in order to provide delays which are inverted in order relative to the delays provided by the circuit 14 for expanded pulses. Thus, no delay is inserted in the signal for the $F_4$ port, four n units of delay are inserted in the $F_3$ port, eight n units of delay are inserted in the $F_2$ port, and twelve n units of delay are inserted in the $F_1$ port.

As the polyphase coded echo pulse is clocked into the delay line of the input-signal expansion circuit 14, various output signals are applied on the line 108. When the polyphase coded echo is fully indexed into the delay line of the input-signal expansion circuit 10, (i.e., the sixteenth clock pulse interval), then a sharp pulse output with 16 times the magnitude of the uncompressed pulse is obtained on line 108.

As noted previously, the object of the present invention is to accentuate the velocity effects on target echos to permit target range and velocity to be estimated accurately using relatively few coded transmissions. This is accomplished by transmitting the successive code elements with equal time spaces between successive elements to make the time difference between the first and the last code elements independent of the number of code elements involved. The foregoing is accomplished by including circuitry for introducing spaces between the output code elements equal to $n-1$ clock periods, where n is an integer equal to $1, 2, 3, 4, \ldots N$. In one embodiment of this design shown in FIG. 2, each of the M expansion stages 18, 20, and 22 in the input signal signal expansion circuit 10 are designed to include a set of N expansion delay elements. For purposes of illustration, four delay elements 150, 152, 154, and 156 are shown in FIG. 2. Each of these delay elements 150–156 made be formed by way of example, simply by a shift register set to add a delay of $t_c$, where $t_c$ is the Nyquist sampling period. Each of these delay elements 150–156 is preceded by an attendant bypassing switch 160, 162, 164, 166, respectively. Thus, each of the delay elements 150–156 is individually connectable within the expansion stage 18. Each switch 160–166 may be set to either connect its attendant shift register into the delay line or it may be connected to bypass this shift register via the respective bypass lines 170, 172, 174, and 176. Thus, it is clear that a delay of $nt_c$ may be obtained for each of expansion stages 18, 20, 22, where n is an integer equal to $1, 2, 3, \ldots N$.

Likewise, in order to accommodate the $nt_c$ delays inserted between each of the replicas in the input signal expansion circuit 10, delays of $nMt_c$ are utilized for each of the M−1 delays in the time dispersion circuit 14, where n is an integer equal to 1, 2, 3, ... N. Again, for purposes of illustration, the first delay stage 90 is shown in FIG. 2 to include four first delay elements 180, 182, 184, and 186. Each of these first delay elements 180–186 may be comprised simply of a shift register circuit set to have a delay of $Mt_c$, where M is the number of points of the FFT and $t_c$ is the Nyquist sampling period. Again, each of the first delay elements 180–186 is preceded by an attendant bypass switch 190, 192, 194, and 196, respectively. The switches 190–196, when set in one position, act to connect their attendant first delay elements into the first delay stage, while in another switch position, act to bypass their attendant first delay elements via the bypass lines 200, 202, 204, and 206. Thus, it can again be seen that each of the N first delay elements in each of the first delay stages in the time dispersion circuit 14 is individually connectable within that first delay stage.

In order to effect control over this series of switches, a separate control circuit may be utilized for each of the M expansion stages and for each of the M first delay stages. Such a control circuit would be simply comprised of a series of ganged switches formed by parallel single-pole two position switches. However, in a preferred embodiment of the control circuit, a single control circuit 210 is utilized to control both the switches in the input signal expansion circuit 10 and the time dispersion circuit 14. Since the setting of switch 160 (switch 1) to insert expansion delay element 150 would require the attendant switching into the line of first delay element 180 in the time dispersion circuit 90, both switch 160 and 190 are controlled by the same switch in the control circuit 210 designated as the point 212. The switch 212 also controls switch 1 in each of the expansion delay stages 20 and 22 and switch 1 in each of the first delay stages 92 and 94. This switch 212 inserts a delay of $t_c$ in each of the expansion delay stages and a delay of $Mt_c$ in each of the first delay stages.

Likewise, switch point 214 controls switch 162 (switch 2) in the expansion delay stage 18 and also controls switch 192 (switch 2) in the first delay stage 90. Additionally, point 214 controls switch 2 in each of the other expansion delay stages 20 and 22 in the input expansion circuit 10 and controls switch 2 in each of the other first delay stages 92 and 94 in the time dispersion circuit 14. This switch at point 214 may be utilized in conjunction with the setting of the switch of point 212 to provide a delay of $2t_c$ in each of the expansion delay stages of the input expansion delay circuit 10 and a delay of $2Mt_c$ in each of the first delay stages in the time inversion circuit 14. Likewise, switch point 216 controls switch n in all of the expansion delay stages of the input expansion circuit 10 and also switch n in all of the first delay stages in the time dispersion circuit 14. Switch point 218 controls switch N in all of the expansion delay stages and switch N in all of the first delay stages. By setting all four switch points 212–218 in the control circuit 210, a delay of $Nt_c$ may be applied in each expansion delay stage in the input signal expansion circuit 10 and a delay $NMt_c$ in each of the first delay stages in the time inversion circuit 14. Thus, the control circuit 210 can be implemented simply by a series of single-pole two-position switches.

It should be noted that the control circuit embodiment discussed above is only one possible implementation for this design. There are a wide variety of control implementations and ganged switch configurations which may be utilized to implement the present invention.

Thus, it can be seen that the length of the delays in the input signal expansion circuit 10 and the time inversion circuit 14 are switch controllable. Accordingly, the time separation introduced between code elements in any phase coded waveform is controllable permitting control over the minimum resolvable velocity of the expansion-compression circuit.

It is again noted that the present invention is based on the discovery that the relationship between the uncompressed pulse length T and the target velocity for maximum response $V_m$, namely $V_m = \lambda/4T$, holds even when the transmit pulse length T is divorced from the pulse compression ratio, i.e., $\rho \neq TB$, and divorced from the bandwidth, i.e., $kB \neq T$. Accordingly, a digital FFT polyphase pulse compressor may be utilized to simulate the frequency-modulation-derived waveform, while at the same time, permitting spaces to be placed between code elements of the uncompressed pulse. These spaces increase T without a concommittant change in the bandwidth B and the pulse compression ratio. Thus, the quantity $V_m T$ can be arbitrarily set to any desired value. If $V_m T = \lambda/4$, then an up-chirp compressor will compress an echo from a target of velocity $V_m$ in a range cell adjacent to the compressed echo from the same target from the down chirp compressor. Higher velocity targets produce larger range-doppler coupling shifts in the compressed output pulses. If $V_m T$ is made equal to $\lambda/2$, then a full range cell will separate the oppositely chirped compressed pulses. An additionally range cell can be added between the two compressed pulses for every ¼ wavelength added.

Accordingly, it can be seen that by increasing the time delays in order to introduce spaces between the output code elements equal to n−1 clock periods, the transmitted waveform duration will be increased from T to nT. This increase in the uncompressed pulse length T results in making the uncompressed pulse length T independent of n the pulse compression ratio and the bandwidth of the system. Thus, the minimum resolvable velocity $V_m$ can be controllable at will simply by increasing the uncompressed pulse length T i.e., T may be made long enough to cause any desired target radial velocity V to produce a phase difference of at least $\phi = 4\pi VT/\lambda$. The foregoing can be accomplished with relatively few coded elements in the uncompressed pulse. This feature provides a major cost savings in the reduction of FFT hardware required.

As noted previously, the present invention has been described in the context of expander-compressor with a compression ratio of $\rho = 16$. It is again reiterated the present invention is not limited in any fashion to such a compression ratio or to a sixteen element code. The designer has the option of choosing a wide variety of pulse compression ratios and implementing such ratios by means of a wide variety of input-signal expansion circuits.

Moreover, it should also be understood that although the present design was described in the context of the P-3 polyphase pulse compression code, there are a wide variety of other doppler tolerant frequency-modulation-derived polyphase codes which may be utilized.

It should also be understood by one skilled in the art that in digital implementations of the present invention, the signal propagating through the circuit of FIG. 1 will be complex in nature, i.e., having I and Q video components. Accordingly, a second input signal expansion circuit should be included for operating on the Q component of the signal. All of the connector lines for the phase weights 50–56 and all of the connector lines in the FFT steering filter matrix and the output lines therefrom should be double lines in order to operate on the Q component of the signals. Additionally, the signal time dispersion circuit 14 should include an additional circuit to process the Q component of the signal. Since the processing and the connections for the Q component of the signal is identical to that shown in FIG. 1 for the I component of the signal, and since the display of these extra Q lines would greatly complicate the figures, these Q lines have been left off of the drawing for purposes of clarity.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A pulse expander-compressor comprising:
an input signal expansion circuit responsive to an applied pulse for successively generating M replicas y(m) of the pulse with the time spacing between the end of one pulse replica and the beginning of the next pulse replica equal to a constant $(n-1)t_c$, where n is an integer $n=2, 3, 4 \ldots N$, and $t_c$ is the Nyquist sampling period for the bandwidth of the applied pulse;
a matched filter weighting circuit for receiving said M pulse replicas from said input-signal expansion circuit and weighting said pulse replicas y(m) with predetermined weights to effect the phase weights for a doppler tolerant polyphase code and providing M weighted output pulses; and
a time dispersion circuit including a plurality of adder means and first delay stages connected in series, said adder means alternating with said first delay stages, each of said adder means being connected to receive a different one of said M weighted output pulses from said weighting circuit, each of said first delay stages providing a delay which is $Mnt_c$; wherein said expander-compressor is clocked at the Nyquist rate for the bandwidth of said applied pulse.

2. A pulse expander-compressor as defined in claim 1, wherein said input signal expansion circuit comprises:
$M-1$ expansion stages for generating said M replicas, with each expansion stage comprising a set of N expansion delay elements individually connectable within said expansion stage to delay said applied pulse; and
first switching means for controlling which of said N expansion delay elements are connectable within said expansion stage to yield a delay of $nt_c$ for each expansion stage.

3. A pulse expander-compressor as defined in claim 2, wherein each of said first delay stages of said time dispersion circuit comprises a set of N first delay elements individually connectable within said first delay stage to delay a selected one of said M weighted output pulses; and
second switching means for controlling which of said N first delay elements are connectable within said first delay stage to yield a delay of $nMt_c$.

4. A pulse expander-compressor as defined in claim 3, wherein said first and second switching means comprise:
an individual switch for each of said N expansion delay elements and said N first delay elements; and
a control circuit for simultaneously operating the same chosen switches in the set of N switches in each of said M expansion stages and in each of said M first delay stages.

5. A pulse expander-compressor as defined in claim 4, wherein each of said N first delay elements has a delay of $Mt_c$, and wherein each of said expansion delay elements has a delay of $t_c$.

6. A pulse expander-compressor as defined in claim 5, wherein said matched filter weighting circuit comprises a digital Fast Fourier Transform circuit.

7. A pulse expander-compressor comprising:
an input-signal expansion circuit responsive to an applied pulse of time-width $t_c$ for successively generating M replicas y(m) of the pulse via a set of expansion delay stages;
a matched filter weighting circuit for recieving said M pulse replicas from said input-signal expansion circuit and weighting said pulse replicas y(m) with predetermined weights to effect the phase weights for a doppler tolerant polyphase code, and providing M weighted out pulses;
a time-dispersion circuit for appropriately delaying each of said M weighted output pulses with a set of delays; and
means for introducing spaces between output code elements, i.e., between the end of one code element and the beginning of the next code element, equal to $n-1$ clock periods where n is an integer from $n=2, 3, 4, \ldots N$;
wherein said expander-compressor is clocked at the Nyquist rate for the bandwidth of said applied pulse.

8. A pulse expander-compressor as defined in claim 7, wherein said space introducing means comprises:
means for increasing the delays in each of said expansion delay stages in said input signal expansion circuit to $nt_c$, where n is an integer from $n=2, 3, 4 \ldots N$; and
means for increasing the delays in said time dispersion circuit to $n\ Mt_c$.

9. A pulse expander-compressor as defined in claim 8, wherein said expansion delay stage increasing means comprises a set of N expansion delay elements individually connectable in series with said expansion delay stages; and
first switching means for controlling which of said N expansion delay elements are connected to yield a delay of $nt_c$ for each of said expansion delay stages.

10. An input expander-compressor as defined in claim 9, wherein said delay increasing means for said time dispersion circuit comprises M first delay stages, with each first delay stage including a set of N first delay elements individually connectable in series within said first delay stage; and
second switching means for controlling which of said N first delay elements are connected in series within said first delay stage to yield a delay of $nMt_c$.

11. A pulse expander-compressor as defined in claim 10, wherein said first and second switching means comprise:
an individual switch for each of said N expansion delay elements and said N first delay elements;
a control circuit for simultaneously operating the same chosen switches in the set of N switches in each of said M expansion stages and in each of said M first delay stages.

* * * * *